Nov. 12, 1929.  J. T. WELCH  1,735,026

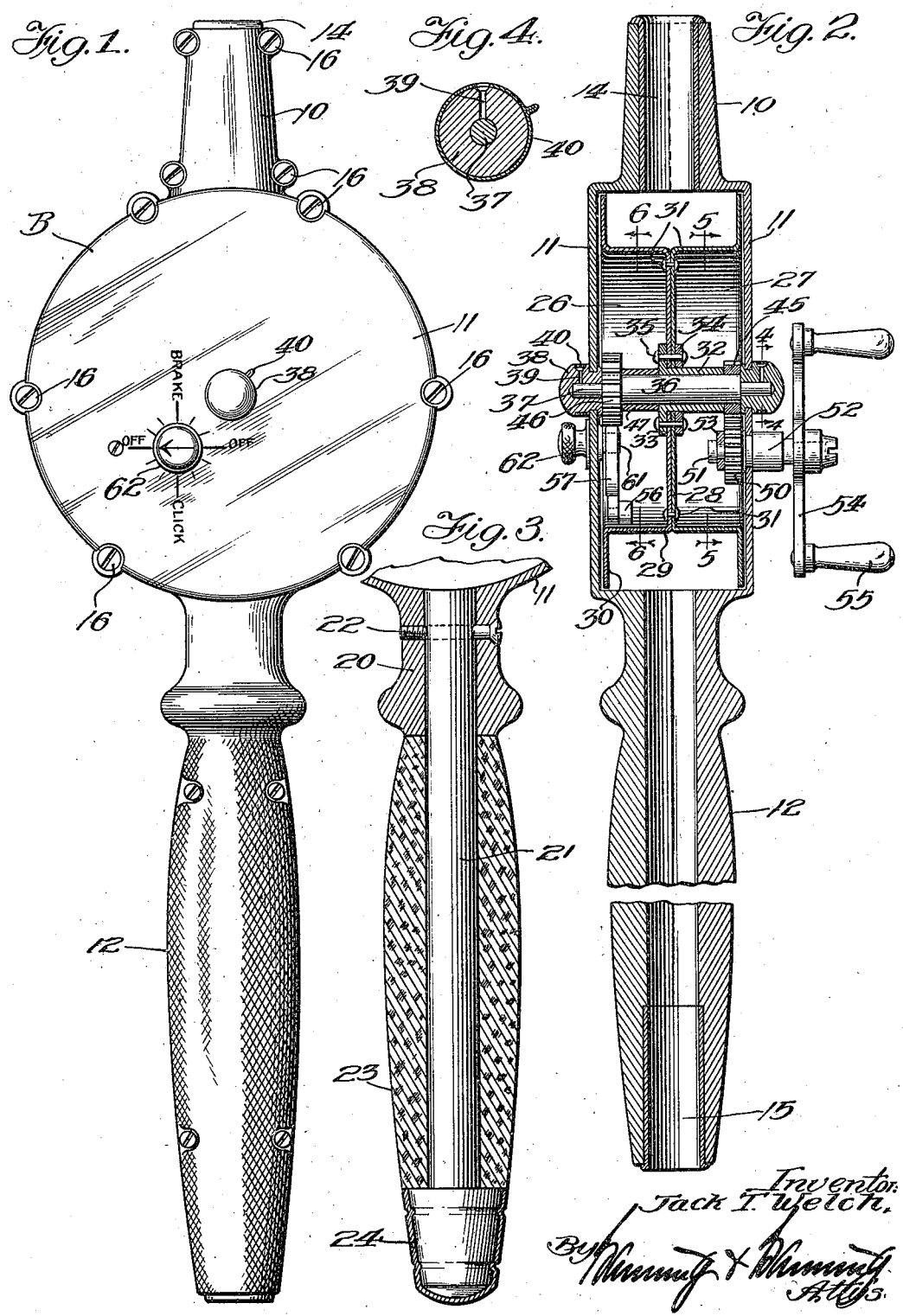

FISHING REEL

Filed June 16, 1927   2 Sheets-Sheet 2

Inventor:
Jack T. Welch,
By
Attys.

Patented Nov. 12, 1929

1,735,026

UNITED STATES PATENT OFFICE

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN

FISHING REEL

Application filed June 16, 1927. Serial No. 199,232.

This invention relates to a fishing reel of the type which is built into the rod handle as distinguished from reels which are attached thereto as a separate unit.

The present reel combines numerous advantages in the direction of simplicity, reliability, low cost of manufacture, etc. It is also adapted for right or left hand bait casting, and, if desired, may be used as a fly fishing reel. In addition to these general advantages, the housing for the reel may be formed of a light metal, such as aluminum, and be die-cast to the required form. Such a reel is preferably built in as part of a handle for a fishing rod, and can also be equipped with a grasp of cork, if this be preferred. With the present reel I may include a click and drag mechanism having a single control therefor, thereby conducing to further simplicity and economy in construction and operation.

Various features such as these characterize the present invention of which a suggestive embodiment is set forth in the accompanying drawings in the manner following:

Figure 1 is a side elevation of a rod handle unit equipped with the present reel structure;

Fig. 2 is a longitudinal section taken centrally through Fig. 1;

Fig. 3 is a detail in longitudinal section of a modified form of grasp for the handle unit;

Figure 5:
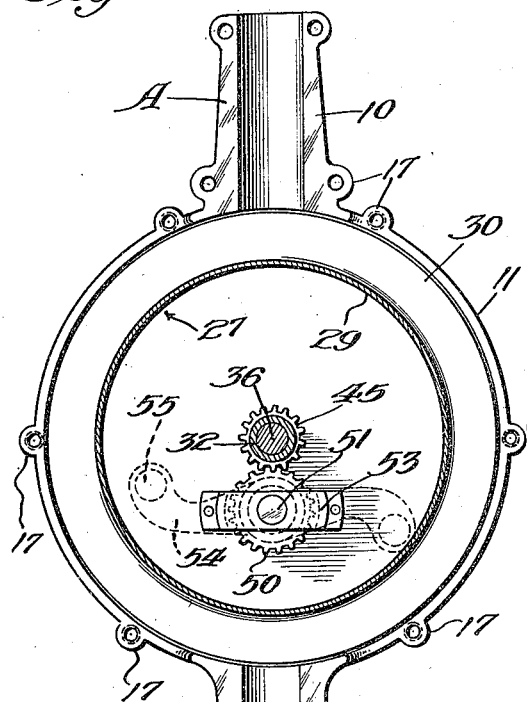
Figure 6:
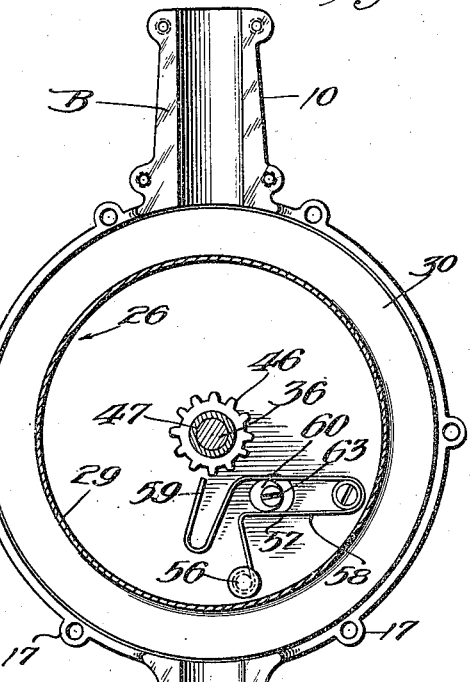
Figure 7:
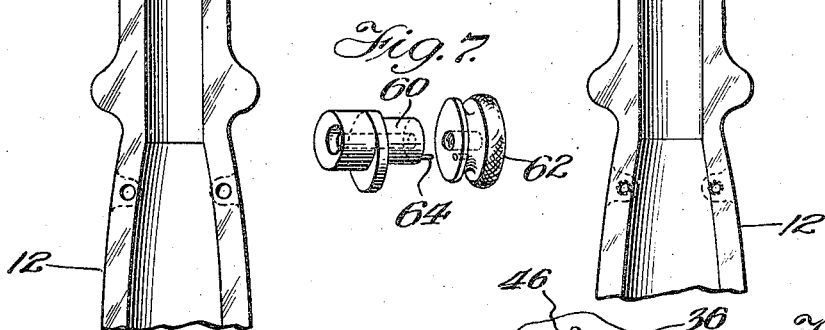
Figure 8:
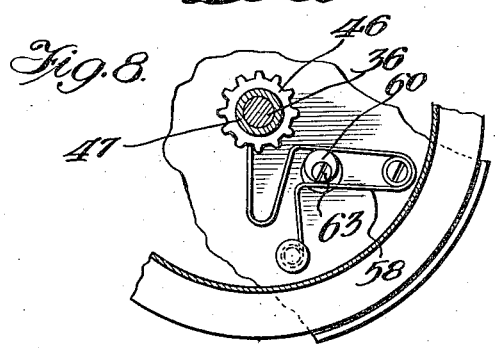
Figure 9:
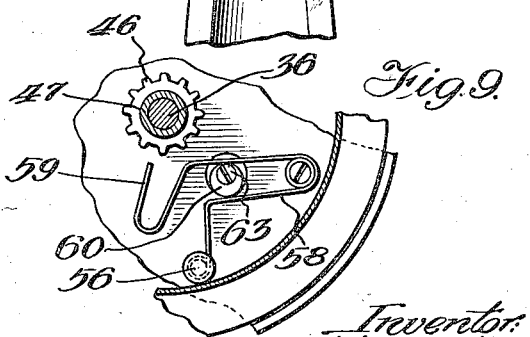

Fig. 4, which is an enlarged detail in section, taken on line 4—4 of Fig. 2, shows the oiling ring which may be provided for the reel bearings;

Figs. 5 and 6 are longitudinal sections taken respectively on lines 5—5 and 6—6 of Fig. 2;

Fig. 7 is a perspective view of the click and brake control showing the parts thereof in separated relation;

Fig. 8 is a fragmentary detail of the click mechanism, the view being otherwise similar to Fig. 6; and Fig. 9, which is a view similar to Fig. 8, shows the parts in another position.

I would have it understood that the present reel may be applied to any of the usual types of rod, jointed or otherwise. As shown, it is incorporated into the handle unit of a sectional rod. In the preferred form of structure, the handle unit comprises two complementary parts designated as A and B respectively, which together form the reel housing and grasp for the rod. As suggested in Figs. 1, 2, 5 and 6, each of these handle parts which is a duplicate of the other comprises a neck 10 upstanding from a circular head 11 below which depends a grasp 12 of appropriate configuration. These two parts may desirably be formed by die-casting from aluminum, or other selected material, and the walls thereof provide between them an enclosure adapted to receive a sleeve 14 in the neck, a reel mechanism within the head, and a second sleeve 15, in the grasp, all as shown in Fig. 2. By this construction the ferrule-tipped end of an associated rod may be inserted into the sleeve at either end of the handle making this unit reversible with respect to the rod with which it is used. The two parts of the handle unit are detachably joined as by means of screws 16 which pass from one to the other through holes which are provided in ears 17 outwardly extending from the circular walls 11.

In Fig. 3 I have suggested a slightly modified construction which differs from that just described, in that a stub 20 which depends from the head 11 furnishes support for one end of a rod 21, shown as connected thereto by a screw 22, the rod forming a core upon which is mounted a cork grip 23. At the lower end of this grip may be affixed a ferrule 24 in the usual manner.

Within the head portion of the handle unit is accommodated the reel mechanism. As shown, this comprises a two part spool the components 26 and 27 whereof are of duplicate construction. Each of these spool components is cup-shaped being provided with a back wall 28 united to a circular peripheral wall 29 from which is extended a radial flange 30. The two spool components thus formed are arranged back to back and connected together in any suitable manner as by means of rivets 31. Centrally of each back wall 28 is a circular opening through which is extended a collar 32 having at one end a flange 33. This flange abuts one wall 28 and is in complementary relation to a ring 34 abutting the other wall 28, rivets 35 being passed through the two walls, the flange, and ring to assist in joining the two spool components in unitary relation. Extending through the collar is a spool shaft 36 having a fast connection therewith. The opposite ends of this shaft are reduced as at 37 to form trunnions which are journaled in bearing members 38, one affixed to each head wall 11. A radial oil hole 39 extends through each bearing upon the outer face of which is mounted a sliding ring 40 having an opening at a single point therein. When this ring is adjusted to the position of Fig. 4 oil can be introduced into the passage 39 after which the ring is shifted to a different position to seal the oil in place.

Adjacent one bearing member 38 is a spool shaft pinion 45 which also may abut the proximate end of the collar 32. In like manner a click pinion 46 is carried at the opposite shaft end adjacent the proximate bearing member. If desired, a spacing sleeve 47 may be interposed between the click pinion and the collar flange 33. All the parts thus associated with the spool are in unitary relation and are readily accessible for inspection, cleaning, or repair upon disconnecting the two sections of the handle.

The driving mechanism for the reel which is very simple may comprise a driving pinion 50 in mesh with the spool pinion 45. This driving pinion is carried upon a stub shaft 51 which is rotatably mounted in two bearing members 52 and 53 carried by the head wall 11, the latter bearing supporting the inner end of this shaft. The outer end of the stub shaft which protrudes exteriorly of the head wall 11 is equipped with the usual crank 54 having handles 55 for convenient manipulation thereof. Because of the fact that the spool is built into the handle unit, with the spool and rod axes intersecting, it is possible to utilize a spool of larger diameter than is ordinarily practicable. For this same reason it is unnecessary to utilize a complex gear assembly for rotation of the reel, a simple arrangement with a ratio of perhaps two to one being entirely adequate.

Referring now to the click mechanism which is shown best in Figs. 6 to 9, I prefer to utilize a separate pinion 46, although the spool pinion 45 would serve the purpose, if desired. The click may comprise a flat wire spring bent upon itself and around a stud 56 to provide parallel arms 57 one of which extends laterally toward the spool periphery at which point it is provided with a shoe 58 for engaging therewith. The other spring arm is bent to provide an end section 59 which is extended radially toward the click pinion 46. Between the two arms lies a cam which may take the form of an eccentric 60 on one end of a stub shaft 61 having a rotatable mounting in the head wall 11. Associated detachably with this shaft is an operating knob 62 therefor, connected thereto, if desired, by a screw 63. In addition, a pin 64 which is extended from the end of this shaft is adapted to enter a hole in the knob so as to assure a non-rotative relation between these parts.

By rotating this knob which lies exteriorly of the reel housing, I may place the click and brake in any of the three positions suggested in Figs. 6, 8 and 9, a visual indication whereof is afforded by suitable markings on the outside of the reel, as shown in Fig. 1. It will be noted that the shoe 58 which is adapted to be moved toward and from the peripheral wall 29 of the spool will act, upon occasion, as a brake or drag therefor (see Fig. 9). In the other extreme position shown in Fig. 8 the spring end 59 is in engagement with the click pinion 46. In the intermediate position of Fig. 6, both the click and drag are disengaged. The stud 56 which holds the spring in place may desirably connect tightly therewith so as to assist in returning the parts to the neutral position of Fig. 6. It is to be noted in this connection that the click and drag mechanism consists of a single unit which utilizes a single control whose rotative movements need not exceed 180° for all purposes.

It is possible to use the present reel with its operating mechanism located either to the right or left hand side. In addition, the handle unit may be reversed as in fly fishing. On such occasions as access may be desired to the spool, the separation of the two handle parts may be readily effected without causing any disassembly of the operating units therewithin. As shown, the click and brake mechanism is carried by one part of the handle, and the driving mechanism by the other, the spool being removably supported between these parts. For this reason the operation of taking the reel apart or putting it together again may be performed expeditiously and without difficulty in the reassembly of the operating parts already described.

I claim:

1. In combination, a fishing rod having a combined reel housing and grip longitudinally divided into two similar parts, a spool rotatably mounted in the housing and freely removable therefrom when the handle parts are separated, and a driving mechanism for the spool having a mounting on one handle part.

2. A combined reel housing and grip split lengthwise into two parts the walls of which are configured to provide a reel chamber therebetween and a grip, a spool shaft extending transversely across the chamber with its ends supported by the walls, a spool carried fast on the shaft, and driving mechanism rotatably mounted on one handle wall and adapted to impart rotation to the spool.

3. A combined reel housing and grip consisting of two identical castings.

4. A combined reel housing and grip consisting of two identical castings having members thereon adapted to support operative elements of the reel.

5. A combined reel housing and grip consisting of two similar parts transversely connected and providing between them a reel chamber.

6. A combined reel housing and grip consisting of two similar parts transversely connected and having members thereon adapted to support operative elements of the reel.

7. A combination reel housing and grip consisting of two similar parts transversely connected and having sockets at its ends for reversibly receiving a fishing rod.

8. A combined reel housing and grip consisting of two similar complementary parts transversely connected and providing between them a reel chamber, a driving mechanism rotatably mounted on one part, a click mechanism mounted on the other part, and a reel having a shaft extending between the two parts and freely detachable therefrom when the parts are separated.

J. T. WELCH.